US012392460B2

(12) United States Patent
Xu

(10) Patent No.: US 12,392,460 B2
(45) Date of Patent: Aug. 19, 2025

(54) LIGHT BODY, STRING LIGHT, AND ASSEMBLING METHOD OF STRING LIGHT

(71) Applicant: JIANGMEN CITY SHENGDA LIGHTING CO., LTD., Jiangmen (CN)

(72) Inventor: Xiaojun Xu, Jiangmen (CN)

(73) Assignee: JIANGMEN CITY SHENGDA LIGHTING CO., LTD., Jiangmen (CN)

( * ) Notice: Subject to any disclaimer, the term of this patent is extended or adjusted under 35 U.S.C. 154(b) by 0 days.

(21) Appl. No.: 18/512,040

(22) Filed: Nov. 17, 2023

(65) Prior Publication Data

US 2025/0129903 A1 Apr. 24, 2025

(30) Foreign Application Priority Data

Oct. 23, 2023 (CN) ......................... 202311378975.3

(51) Int. Cl.
*F21V 21/00* (2006.01)
*F21S 4/10* (2016.01)
*F21V 3/02* (2006.01)
*F21V 17/12* (2006.01)

(52) U.S. Cl.
CPC .................. *F21S 4/10* (2016.01); *F21V 3/02* (2013.01); *F21V 17/12* (2013.01)

(58) Field of Classification Search
CPC ............... F21S 4/10; F21V 3/02; F21V 17/12
See application file for complete search history.

(56) References Cited

U.S. PATENT DOCUMENTS

2012/0025705 A1* 2/2012 Chang ....................... F21K 9/23
315/32
2015/0354768 A1* 12/2015 Gaumann ............... F21S 9/035
362/183
2017/0067623 A1* 3/2017 Lin ........................... F21S 4/10

FOREIGN PATENT DOCUMENTS

CN 115355459 A * 11/2022 ................ F21S 4/10
CN 218032765 U * 12/2022

OTHER PUBLICATIONS

2022.*

* cited by examiner

*Primary Examiner* — Elmito Breval

(57) ABSTRACT

A light body, a string light, and an assembling method of the string light that relate to a technical field of string light assembling technology are disclosed. Two light-emitting body connecting structures are connected with the lampshade, and a light-emitting body is fixed in the lampshade. The two light-emitting body connecting structures are electrically connected with the light-emitting body, Through power connecting ports respectively protruded from the light-emitting body connecting structures, the two light-emitting body connecting structures are movable in openings of the lampshade to adjust positions thereof. Therefore, the two light-emitting body connecting structures are plugged with power connecting plugs of the light-emitting body, which effectively realizes quickly installation of the light-emitting body in the lampshade and improves assembly efficiency.

15 Claims, 4 Drawing Sheets

LIGHT BODY, STRING LIGHT, AND ASSEMBLING METHOD OF STRING LIGHT

TECHNICAL FIELD

The present disclosure relates to a technical field of string light assembling technology, and in particular to a light body, a string light, and an assembling method of the string light.

BACKGROUND

A string light is a decorative lighting fixture made by stringing small bulbs together, which is usually used for holiday celebrations, indoor and outdoor decorations, party decorations, etc. The string light come in different colors, shapes and bulb types, such as colorful ball lights, flower-shaped lights, star lights, etc. People often hang string lights on trees, walls, or in indoor and outdoor spaces to create a warm, romantic or festive atmosphere. Some of the string lights also come with different flashing modes and ability to adjust brightness, making them diverse and attractive.

In the prior art, the Chinese patent application No. CN202221840737.0 discloses an internally threaded lampshade connecting structure, a light body and a lamp string. The light body comprises two openings formed inwardly penetrating an outer surface of a lampshade along a first direction and two terminals. Inner threads are arranged on an inner wall of each of the openings and at least a portion of each of the terminals is inserted into a corresponding opening along the first direction. Outer threads matched with the inner threads are arranged on an outer wall of each of the terminals. Each of the terminals is inserted into the corresponding opening of the lampshade and is screwed with the lampshade through the outer threads and the internal threads to facilitate the assembly, maintenance and parts replacement of the string light.

A light-emitting body thereof is arranged in the lampshade and is movably connected between the two terminals, and the two terminals are screwed with the lampshade. The two terminals arranged on the light-emitting body are defined as a terminal A and a terminal B respectively. When assembling the light body, the terminal A is first screwed with a first opening of the lampshade, then the terminal B is plugged into a first end of the light-emitting body, and the light-emitting body is inserted into the lampshade from a second opening thereof to abut against a second end of the light-emitting body against the first opening of the lampshade. Then, the second end of the light-emitting body is aligned with a plug socket of the terminal A, and the terminal B is tightly screwed to complete the assembly. During the assembly, since a port of the terminal B is a flat port, when the terminal B abuts against the first opening of the lampshade, it is difficult to adjust a position of the second end of the light-emitting body by holding the terminal B, and it is hard to align the second end of the light-emitting body with the plug socket of the terminal A. Moreover, if the light-emitting body is in a long strip shape, the light-emitting body may swing during the assembly, making it more difficult to assemble and leading to low work efficiency.

SUMMARY

In view of defects in the prior art, an object of the present disclosure is to provide a light body. By protruding a power connecting port on one end surface of a terminal, and providing the power connecting port having a size less than an opening of a lampshade, the power connecting port is allowed to deeply inserted into the opening of the lampshade. Therefore, the power connecting port is movable to be adjusted in the opening to facilitate alignment and insertion of a light-emitting body in the lampshade, thereby effectively improving efficiency of assembly of a string light thereof.

To achieve the above object, the present disclosure provides a light body. The light body comprises a lampshade, two light-emitting body connecting structures, and a light-emitting body.

An accommodating cavity is defined in the lampshade. Openings communicated with the accommodating cavity are defined on the lampshade. The openings comprise a wiring input terminal opening and a wiring output terminal opening.

The two light-emitting body connecting structures comprise wiring terminals. The wiring terminals comprise terminal bodies matched with the openings and power connecting ports. The terminal bodies are respectively detachably connected with the openings. Each of the power connecting ports protrudes from an end surface of a first end of a corresponding terminal body of the terminal bodies.

A size of each of the power connecting ports is less than a size of each of the openings of the lampshade. Each of the power connecting ports is insertable into the lampshade from a corresponding opening of the openings to align and connect with the light-emitting body.

The light-emitting body is detachably arranged in the accommodating cavity of the lampshade. Power connecting plugs are arranged on two ends of the light-emitting body. When the light-emitting body is arranged in the accommodating cavity, the light-emitting body is connected with the openings of the lampshade through the two light-emitting body connecting structures, and the power connecting plugs arranged on the two ends of the light-emitting body are respectively plugged into the power connecting ports of the two light-emitting body connecting structures.

In one optional embodiment, outer threads are defined on an outer side of each of the terminal bodies. Inner threads are defined on each of the openings. The outer threads are matched with the inner threads. The power connecting ports comprise rotatable plugs configured to plug into the light-emitting body.

In one optional embodiment, the light body comprises wire rods. Each of the wire rods passes through a second end of a corresponding terminal body of the terminal bodies and is electrically connected with a corresponding power connecting port of the power connecting ports.

In one optional embodiment, an annular limiting piece is arranged on an end surface of the second end of each of the terminal bodies.

In one optional embodiment, one handle piece arranged on one side of an end portion of each of the wire rods is connected with the second end of each of the terminal bodies, or a plurality of handle pieces respectively arranged on two sides of the end portion of each of the wire rods are connected with the second end of each of the terminal bodies.

In one optional embodiment, the power connecting plugs comprise a wiring input terminal plug and a wiring output terminal plug. The wiring input terminal plug and the wiring output terminal plug are respectively arranged on the two ends of the light-emitting body. A power supply input terminal of the light-emitting body is electrically connected with the wiring input terminal. A power supply output terminal of the light-emitting body is electrically connected with the wiring output terminal plug.

In one optional embodiment, the light-emitting body comprises a light strip and a support. The light strip is wrapped on an outer side of the support.

In one optional embodiment, the light body further comprises a circuit board. The support is hollow and the circuit board is arranged inside the support. The circuit board is electrically connected with the light strip. The wiring input terminal plug and the wiring output terminal plug are respectively fixedly arranged on two ends of the circuit board. An input terminal of the circuit board is electrically connected with the wiring input terminal plug, and an output terminal of the circuit board is electrically connected with the wiring output terminal plug.

Based on the same inventive concept, the present disclosure further provides a string light formed by assembling light-emitting body connecting structures, lampshades, and light-emitting bodies having structures as mentioned above. Through the light-emitting body connecting structures, when each of the light-emitting bodies is installed in a corresponding lampshade, the power connecting plugs arranged on ends of each of the light-emitting bodies are quickly aligned to achieve quick plug-in, which effectively improves assembling efficiency of the string light.

The string light comprises a plurality of light bodies mentioned above and a plurality of wires. The plurality of light bodies comprise a plurality of lampshades.

Each of the light-emitting body connecting structures of each of the plurality of light bodies are electrically connected with a corresponding light-emitting body connecting structure of an adjacent light body through a corresponding wire, so that the plurality of lampshades are connected in series through the plurality of wires.

In one optional embodiment, hanging pieces are hung on the plurality of wires.

Based on the same inventive concept, the present disclosure further provides an assembling method of the string light to achieve quick assembly of the string light. The assembling method comprises:

- a step S1: plugging a first light-emitting body connecting structure of one of a plurality of wires into a first end of one of a plurality of light-emitting bodies;
- a step S2: inserting the one of the plurality of light-emitting bodies into one of a plurality of lampshades from a first opening of the one of the plurality of lampshades; connecting the first light-emitting body connecting structure to the first opening of the one of the plurality of lampshades;
- a step S3: inserting a power connecting port of a second light-emitting body connecting structure of another one of the plurality of wires into the one of the plurality of lampshades from a second opening of the one of the plurality of lampshades; aligning the power connecting port of the second light-emitting body connecting structure to abut against a second end of the one of the plurality of light-emitting bodies; connecting the second light-emitting body connecting structure to the second opening of the one of the plurality of lampshades to enable the power connecting port of the second light-emitting body connecting structure being completely plugged into the second end of the one of the plurality of light-emitting bodies; and
- a step S4: sequentially assembling other light bodies to the plurality of wires according to steps S1, S2 and S3 to complete assembly of the string light.

Compared with the prior art, in the two light-emitting body connecting structures of the light body of the present disclosure, each of the power connecting ports protrudes from the end surface of the first end of the corresponding terminal body of the terminal bodies. When assembling, a first light-emitting body connecting structure is plugged into a first end of the light-emitting body, and the light-emitting body is inserted into a first opening of the lampshade, then the first light-emitting body connecting structure is connected with the first opening of the lampshade.

A second light-emitting body connecting structure is inserted into a second opening of the lampshade. Because the light-emitting body is accommodated in the lampshade, and lengths of the light-emitting body connecting structures connecting the light-emitting body are adapted to a mounting length of the lampshade, when a second end of the light-emitting body moves towards the second opening of the lampshade, the power connecting port of the second light-emitting body connecting structure is inserted into the second opening of the lampshade.

The size of each of the power connecting ports is less than the size of each of the openings of the lampshade, so that the power connecting port of the second light-emitting body connecting structure is movable in the second opening to adjust a position, so as to align with a corresponding power connecting plug arranged on the second end of the light-emitting body. When the second light-emitting body connecting structure is connected with the second opening of the lampshade, the power connecting port of the second light-emitting body connecting structure completely plugged into the second end of the light-emitting body, effectively realizing that the light-emitting body is installed in the lampshade and aligned with the two openings of the lampshade through the two light-emitting body connecting structures, which improves assembly efficiency.

In the two light-emitting body connecting structures of the light body of the present disclosure, the outer threads are defined on the outer side of each of the terminal bodies, and each annular limiting piece is arranged on the end surface of the second end of each of the terminal bodies. Each of the wire rods passes through the second end of the corresponding terminal body of the terminal bodies and is electrically connected with the corresponding power connecting port of the power connecting ports. Each of the power connecting ports protruding from the end surface of the first end of the corresponding terminal body of the terminal bodies is insertable into the lampshade, and each of the wire rods is connected with a corresponding wire or a transformer. The one or the plurality of handle pieces are arranged on the end portion of each of the wire rods are connected, by holding the one or the plurality of handle pieces of each of the wire rods to rotate, the terminal bodies are respectively screwed with the openings of the lampshade, which providing a stress point, avoiding that it is difficult to rotate the terminal bodies by round wires, The light-emitting body connecting structures comprise the rotatable plugs that are insertable into the light-emitting body, When each of the power connecting ports is aligned with the corresponding power connecting plug of the light-emitting body, by screwing each of the power connecting ports into the corresponding terminal body along the inner threads of each of the openings, the light-emitting body connecting structures are plugged into the light-emitting body;

In particular, the one or the plurality of handle pieces of each of the terminal bodies are also configured as reinforcing pieces reinforcing connection between each of the wire rods and the corresponding terminal body to prevent fractures at a joint and improve service life of the wire rods and the terminal bodies.

The light body of the present disclosure comprises the light-emitting body having a wiring input terminal plug and a wiring output terminal plug. The two ends of the light-emitting body are connected with two light-emitting body connecting structures. When the two light-emitting body connecting structures are respectively connected with the two openings of the lampshade, the power connecting ports of the two light-emitting body connecting structures are respectively fixed to the plugs arranged on the two ends of the light-emitting body to realize electrical connection of the light-emitting body while making it easy to disassemble, assemble and fix the light body.

In order to make the light-emitting body emit even light, the light strip wraps the outer side of the support, and the circuit board is arranged inside the support. Two ends of the circuit board are respectively fixedly and electrically connected with the wiring input terminal plug and the wiring output terminal plug. When the light-emitting body connecting structures are docked and plugged into the light-emitting body, the circuit board is served as an effective support piece to enable the connection between the light-emitting body connecting structures and the light-emitting body. Alternatively, two ends of the support are fixedly connected with the wiring input terminal plug and the wiring output terminal plug respectively, which also provide effective support.

In the assembling method of the present disclosure, the first light-emitting body connecting structure is plugged into one of the plurality of light-emitting bodies, the one of the plurality of light-emitting bodies is inserted into and connected with the one of the plurality of lampshades from the first opening of the one of the plurality of lampshades. Then, the power connecting port of the second light-emitting body connecting structure connected with another one of the plurality of wires is inserted into the one of the plurality of lampshades from the second opening of the one of the plurality of lampshades, the power connecting port of the second light-emitting body connecting structure is aligned to abut against the second end of the one of the plurality of light-emitting bodies; and the second light-emitting body connecting structure of another one of the plurality of wires is connected with the second opening of the one of the plurality of lampshades to enable the power connecting port of the second light-emitting body connecting structure being completely plugged into the second end of the one of the plurality of light-emitting bodies. Each two light-emitting body connecting structures are arranged on two ends of each of the plurality of wires, and each of the plurality of wires is connected with corresponding two of the plurality of light-emitting bodies, so the plurality of light-emitting bodies are connected in series, which is simple to assemble the string light, is easy to connect the light-emitting body connecting structures and the plurality of light-emitting bodies, and effectively improves the assembly efficiency of the string light.

BRIEF DESCRIPTION OF DRAWINGS

The drawings are comprised to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor. In the drawing.

In the drawings.

Figure 1:
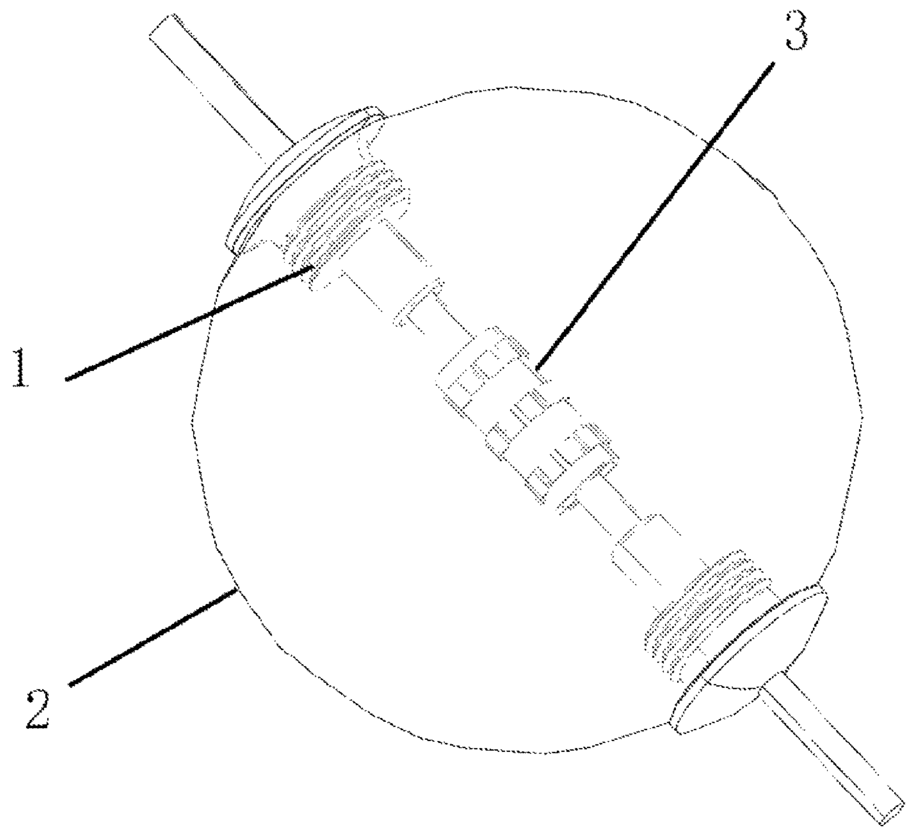
FIG. 1 is a schematic diagram of a light body according to one embodiment of the present disclosure.

1—wiring terminal, 11—terminal body, 111—outer threads, 112—annular limiting piece, 12—power connecting port, 13—wire rod, 14—handle piece; 2—lampshade, 21—lampshade main body, 22—opening; 3—light body, 31—light-emitting body 311—lightstrip, 312—support, 313—circuit board, 32—power connecting plug; 321—wiring input terminal plug, 322—wiring output terminal plug; 4—wire, 41—hanging piece.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

It should be noted that when one component is referred to as being "fixed on" or "arranged on" another component, it can be directly arranged on the other component or it may be indirectly fixed or arranged on the other component through a third component. When one component is said to be "connected with" another component, it may be directly connected with the other component or it may be indirectly connected with the other component through a third component.

It should be understood that in the description of the present disclosure terms such as "length", "width", "upper", "lower", "left", "right", "vertical", "horizontal", "top", "bottom", "inner", "outer", "inner", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified.

It is noted that structures, proportions, sizes, and the like shown in the drawings of the present specification are only used to cooperate with the contents disclosed in the description, so as to be understood and read by those skilled in the art, and are not intended to limit the limiting conditions that can be implemented by the present disclosure, so that the technical content disclosed in the present disclosure should still fall within the scope covered by the technical content disclosed in the present disclosure without affecting the effect and the purpose that can be achieved in the present disclosure.

Embodiment 1

The embodiment is intended to solve problems of difficulty in adjusting and aligning conventional terminals to install a light-emitting body thereof, high assembly difficulty, and low work efficiency.

In two light-emitting body connecting structures of a light body of the present disclosure, each of the power connecting ports protrudes from an end surface of a first end of a corresponding terminal body of terminal bodies. When assembling, a first light-emitting body connecting structure is plugged into a first end of the light-emitting body, and the light-emitting body is inserted into a first opening of a lampshade thereof, then the first light-emitting body connecting structure is connected with the first opening of the lampshade.

A second light-emitting body connecting structure is inserted into a second opening of the lampshade. Because the light-emitting body is accommodated in the lampshade, and lengths of the light-emitting body connecting structures connecting the light-emitting body are adapted to a mounting length of the lampshade, when a second end of the light-emitting body moves towards the second opening of the lampshade, a power connecting port of the second light-emitting body connecting structure is inserted into the second opening of the lampshade. A size of each of the power connecting ports is less than a size of each of the openings of the lampshade, so that the power connecting port of the second light-emitting body connecting structure is movable in the second opening to adjust a position, so as to align with a corresponding power connecting plug arranged on the second end of the light-emitting body. When the second light-emitting body connecting structure is connected with the second opening of the lampshade, the power connecting port of the second light-emitting body connecting structure completely plugged into the second end of the light-emitting body, effectively realizing that the light-emitting body is installed in the lampshade and aligned with the two openings of the lampshade through the two light-emitting body connecting structures, which improves assembly efficiency.

As shown in FIGS. 1-5 and 7, the present disclosure provides a light body. The light body comprises a lampshade 2, two light-emitting body connecting structures, and a light-emitting body 31.

An accommodating cavity is defined in the lampshade 2. Openings 22 communicated with the accommodating cavity are defined on the lampshade 2. The openings 22 comprise a wiring input terminal opening and a wiring output terminal opening.

The two light-emitting body connecting structures comprise wiring terminals 1. The wiring terminals 1 comprise terminal bodies 11 matched with the openings 22 and power connecting ports 12. The terminal bodies 11 are respectively detachably connected with the openings 22. Each of the power connecting ports 12 protrudes from an end surface of a first end of a corresponding terminal body 11 of the terminal bodies 11. A size of each of the power connecting ports 12 is less than a size of each of the openings 22 of the lampshade 2. Each of the power connecting ports 12 is insertable into the lampshade 2 from a corresponding opening of the openings 22 to align and connect with the light-emitting body 31.

The light-emitting body 31 is detachably arranged in the accommodating cavity of the lampshade 2. Power connecting plugs 32 are arranged on two ends of the light-emitting body 31. When the light-emitting body 31 is arranged in the accommodating cavity, the light-emitting body 31 is connected with the openings 22 of the lampshade 2 through the two light-emitting body connecting structures, and the power connecting plugs 32 arranged on the two ends of the light-emitting body 31 are respectively plugged into the power connecting ports 12 of the two light-emitting body connecting structures.

Figure 2:
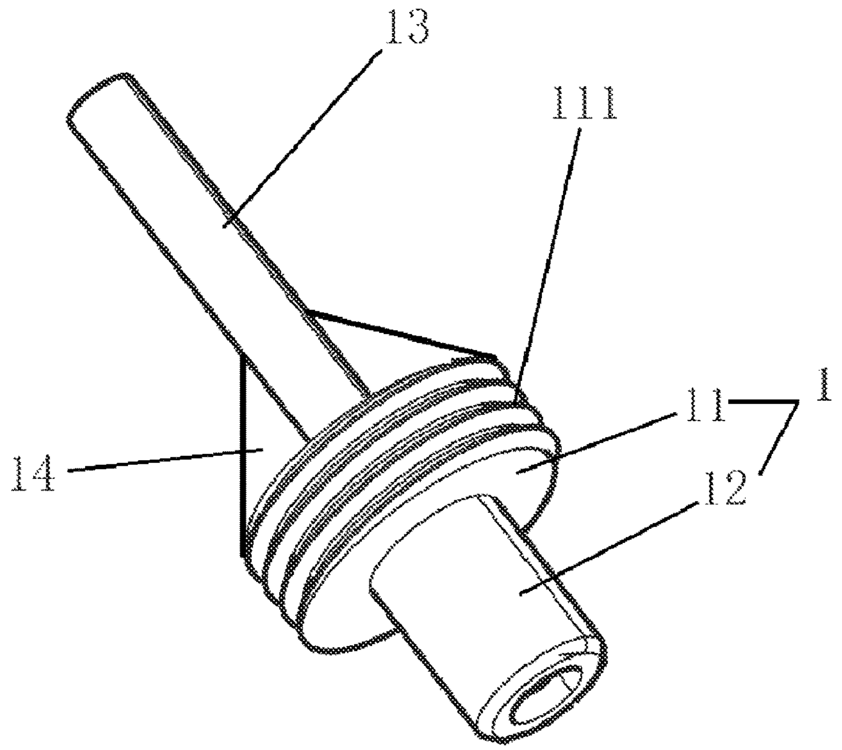
FIG. 2 is a schematic diagram of a light-emitting body connecting structure according to one embodiment of the present disclosure.
Figure 3:
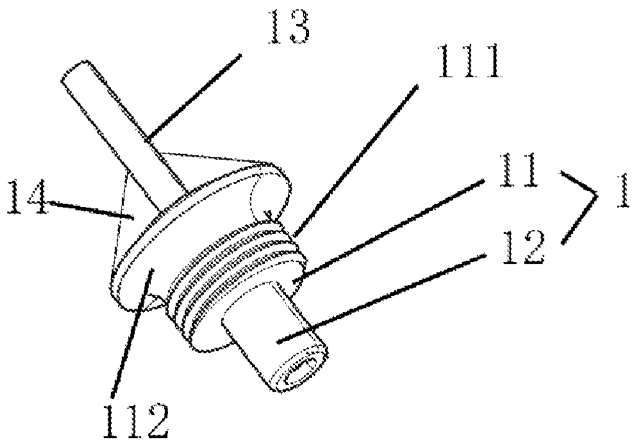
FIG. 3 is a schematic diagram of the light-emitting body connecting structure having an annular limiting piece according to another embodiment of the present disclosure.

Specifically, as shown in FIG. 2 and FIG. 3, outer threads 111 are defined on an outer side of each of the terminal bodies 11. Inner threads are defined on each of the openings 22. The outer threads 111 are matched with the inner threads. The power connecting ports 12 comprise rotatable plugs configured to plug into the light-emitting body 31.

It should be noted that each of the rotatable plugs may comprise a male plug and a female plug matched with the male plug. Each of the rotatable plugs may be a headphone plug, a direct current (DC) plug, an audio plug, and other plugs having a cylindrical connector to support, fixed, and electrically connected with the light-emitting body. 31. During a plugging process, the male plug or the female plug of each of the rotatable plugs are rotated arbitrarily while maintaining electrical connection with the female plug thereof of the male plug thereof.

Specifically, as shown in FIG. 2, the light body comprises wire rods 13. Each of the wire rods 13 passes through a second end of a corresponding terminal body 11 of the terminal bodies 11 and is electrically connected with a corresponding power connecting port 12 of the power connecting ports 12.

Specifically, as shown in FIG. 3, an annular limiting piece 112 is arranged on an end surface of the second end of each of the terminal bodies 11. It should be noted that each annular limiting piece 112 is configured to abut against an outer side of a corresponding opening 22 to prevent a corresponding terminal body of the terminal bodies 11 from being excessively screwed into the corresponding opening 22 of the lampshade 2.

It should be added that the lampshade 2 defines grooves each matched with each annular limiting piece 112, so that each annular limiting piece 112 is embedded in a corresponding groove of the groves. A surface of each annular limiting piece 112 is flush with a surface of the lampshade 2, maintaining the beauty of the light body.

It should be noted that each of the wire rods 13 passes through the second end of the corresponding terminal body 11 of the terminal bodies 11 and is electrically connected with the corresponding power connecting port 12 of the power connecting ports 12, Each of the power connecting ports 12 protruding from the end surface of the first end of the corresponding terminal body 11 of the terminal bodies 11 is insertable into the lampshade 2, and each of the wire rods 13 is connected with a corresponding wire or a transformer.

As shown in FIG. 2, to facilitate each of the terminal bodies 11 to be screwed into or out of the corresponding opening 22 of the lampshade 2, one handle piece 14 arranged on one side of an end portion of each of the wire rods 13 is connected with a second end of each of the terminal bodies 11, or a plurality of handle pieces 14 respectively arranged on two sides of the end portion of each of the wire rods 13 are connected with a second end of each of the terminal bodies 11.

In one optional embodiment, as shown in FIG. 3, when each annular limiting piece 112 is arranged on the end surface of the second end of each of the terminal bodies 11, the one or the plurality of handle pieces 14 arranged on the end portion of each of the wire rods 13 may be connected with a corresponding annular limiting piece 112.

The one or the plurality of handle pieces 14 arranged on the end portion of each of the wire rods 13 are connected with the corresponding terminal body of the terminal bodies 11, by holding the one or the plurality of handle pieces 14 of each of the wire rods 13 to rotate, the terminal bodies 11 are respectively screwed with the openings 22 of the lampshade 2, which providing a stress point, avoiding that it is difficult to rotate the terminal bodies 11 by round wires. The light-emitting body connecting structures comprise the rotatable plugs insertable into the light-emitting body 31, When each of the power connecting ports 12 is aligned with the corresponding power connecting plug of the light-emitting body 31, by screwing each of the power connecting ports 12 into the corresponding terminal body 11 along the inner threads of each of the openings 22, the light-emitting body connecting structures are plugged into the light-emitting body 31. In particular, the one or the plurality of handle pieces 14 of each of the terminal bodies 11 are also configured as reinforcing pieces reinforcing connection between each of the wire rods 13 and the corresponding terminal body 11 to prevent fractures at a joint and improve service life of the wire rods 13 and the terminal bodies 11.

Figure 4:
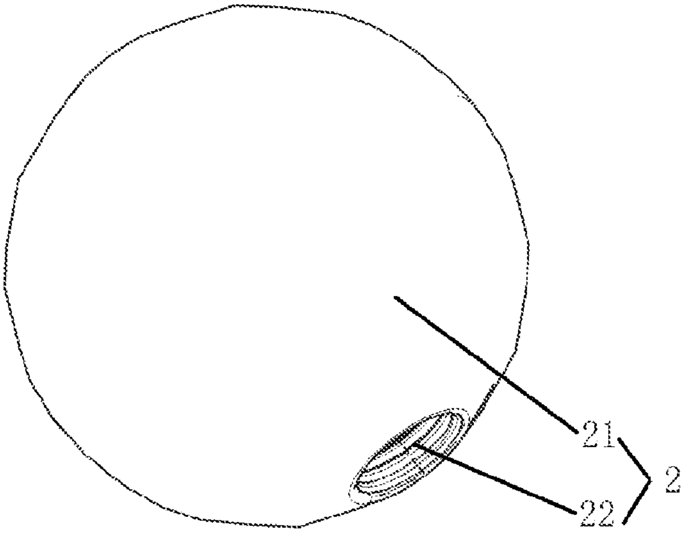
FIG. 4 is a schematic diagram of a lampshade according to one embodiment of the present disclosure.

In addition, as shown in FIG. 4, the lampshade 2 comprises a lampshade main body 21 that is nonopaque, the accommodating cavity is defined inside the lampshade main body 21, and the openings 22 of the lampshade 2 comprises the wiring input terminal opening and the wiring output terminal opening.

The lampshade 2 in the embodiment is an integrally formed circular lampshade 2. In other embodiments, the lampshade 2 has a square or cylindrical shape, which is selected according to specific circumstances.

It should be added that the wiring input terminal opening and the wiring output terminal opening defined on the lampshade 2 of the embodiment are symmetrically or asymmetrically arranged, but an axis direction of the wiring input terminal opening and an axis direction of the wiring output terminal opening are respectively corresponding to the power connecting plugs 32 of the light-emitting body 31.

Figure 5:
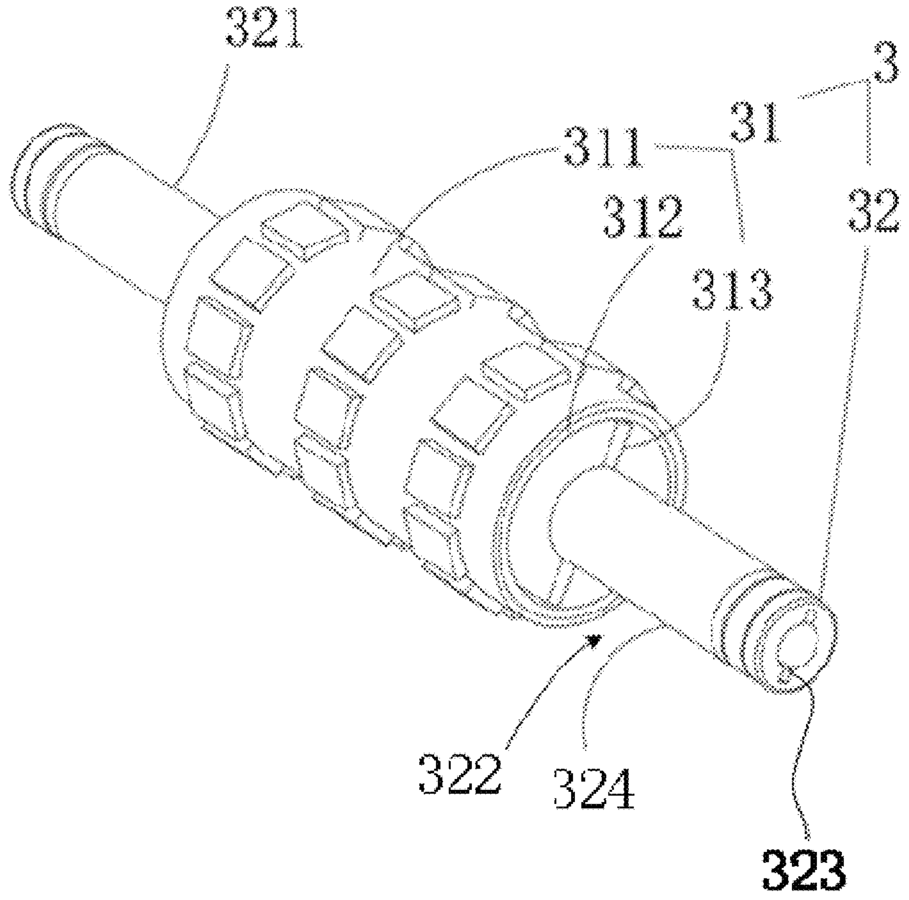
FIG. 5 is a schematic diagram of a light-emitting body according to one embodiment of the present disclosure.

Specifically, as shown in FIG. 5, the power connecting plugs 32 comprise a wiring input terminal plug 321 and a wiring output terminal plug 322. The wiring input terminal plug 321 and the wiring output terminal plug 322 are respectively arranged on the two ends of the light-emitting body 31. each of the power connecting plugs 32 comprise a positive electrode 323 and a negative electrode 324 coaxially aligned. A power supply input terminal of the light-emitting body 31 is electrically connected with the wiring input terminal. A power supply output terminal of the light-emitting body 31 is electrically connected with the wiring output terminal plug 322.

As shown in FIG. 5, to improve uniformity of light emitted by the light-emitting body 31 in the lampshade 2, the light-emitting body 31 comprises: a light strip 311 and a support 312. The light strip 311 wraps an outer side of the support 312. It should be noted that the light strip 311 comprises bulbs or LED lights that are locally provided, and has strip body made from a soft and flexible material, such as a rubber sleeve or plastic. The light strip 311 has a self-adhesive backing that is easily attached to the support 312.

Specifically, as shown in FIG. 5, the light body further comprises a circuit board 313. The support 312 is hollow and the circuit board 313 is arranged inside the support 312. The circuit board 313 is electrically connected with the light strip 311. The wiring input terminal plug 321 and the wiring output terminal plug 322 are respectively fixedly arranged on two ends of the circuit board 313. An input terminal of the circuit board 313 is electrically connected with the wiring input terminal plug 321, and an output terminal of the circuit board 313 is electrically connected with the wiring output terminal plug 322. It should be noted that the support 312 in the embodiment is in a cylinder that is hollow. The light strip 311 is wrapped on an outer side of the cylinder, and the circuit board 313 is placed in the cylinder. In some embodiments, two ends of the support 312 are fixedly connected with the wiring input terminal plug 321 and the wiring output terminal plug 322 respectively, which also provide effective support.

It should be noted that the light-emitting body in the embodiment may also be a light bar, and two ends of the light bar are fixedly and electrically connected with the wiring input terminal plug 321 and the wiring output terminal plug 322.

Embodiment 2

Figure 6:
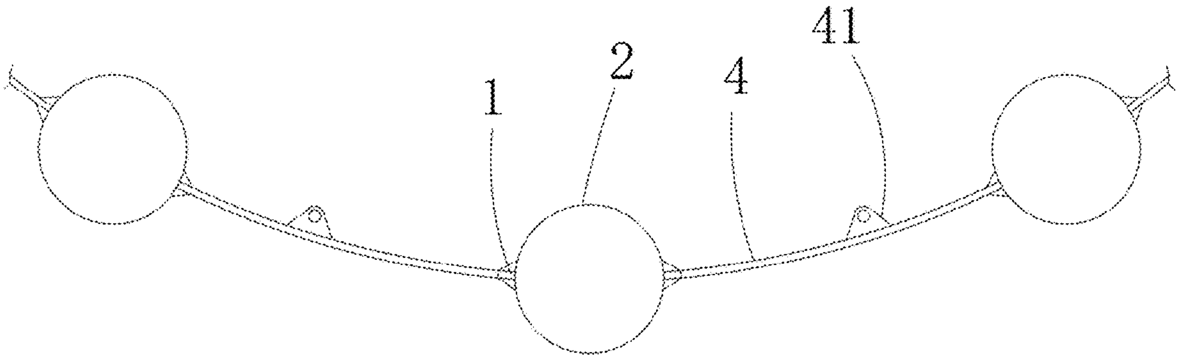
FIG. 6 is a schematic diagram of a string light according to one embodiment of the present disclosure.
Figure 7:
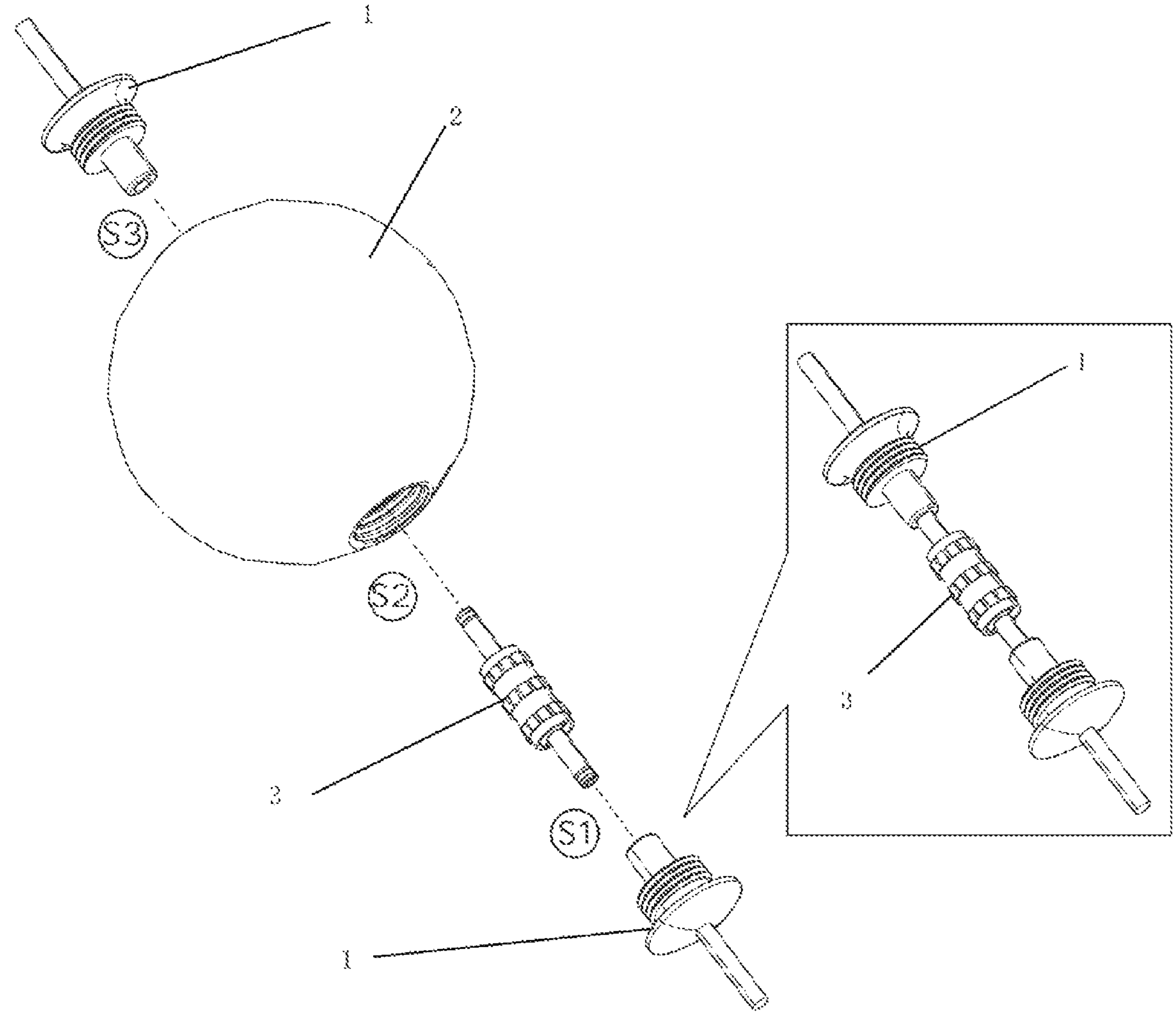
FIG. 7 is a schematic diagram showing an assembling method of the light body through light-emitting body connecting structures according to one embodiment of the present disclosure.

As shown in FIG. 6, the present disclosure further provides a string light. The string light comprises a plurality of light bodies 3 mentioned above and a plurality of wires. The plurality of light bodies 3 comprise a plurality of lampshades 2.

Each of the light-emitting body connecting structures of each of the plurality of light bodies 3 are electrically connected with a corresponding light-emitting body connecting structure of an adjacent light body 3 through a corresponding wire, so that the plurality of lampshades 2 are connected in series through the plurality of wires.

It should be noted that each of the wire rods 13 of each of the light-emitting body connecting structures is extended and connected with another light-emitting body connecting structure of the adjacent light body 3, and the wire rods 13 can also be served as the plurality of wires 4 mentioned above.

Specifically, as shown in FIG. 5, hanging pieces 41 are hung on the plurality of wires 4. The hanging pieces 41 may be rings, which enable the string light to be hung on suitable hooks for decoration.

Embodiment 3

The present disclosure further provides an assembling method of the string light to achieve quick assembly of the string light. The assembling method comprises:

a step S1: plugging a first light-emitting body connecting structure of one of a plurality of wires into a first end of one of a plurality of light-emitting bodies 31;

a step S2: inserting the one of the plurality of light-emitting bodies 31 into one of a plurality of lampshades 2 from a first opening 22 of the one of the plurality of lampshades 2; connecting the first light-emitting body connecting structure to the first opening 22 of the one of the plurality of lampshades 2;

a step S3: inserting a power connecting port 12 of a second light-emitting body connecting structure of another one of the plurality of wires into the one of the plurality of lampshades 2 from a second opening 22 of the one of the plurality of lampshades 2; aligning the power connecting port 12 of the second light-emitting body connecting structure to abut against a second end of the one of the plurality of light-emitting bodies 31; connecting the second light-emitting body connecting structure to the second opening 22 of the one of the plurality of lampshades 2 to enable the power connecting port 12 of the second light-emitting body connecting structure being completely plugged into the second end of the one of the plurality of light-emitting bodies 31; and a step S4: sequentially assembling other light bodies to the plurality of wires according to steps S1, S2 and S3 to complete assembly of the string light.

It should be noted that in the assembling method of the embodiment, the light-emitting body connecting structures are connected with the openings 22 of the plurality of lampshades 2 through threaded connection. In other embodiments, the light-emitting body connecting structures are connected with the openings 22 of the plurality of lampshades 2 through snap/clamping connection, It is understood that through the threaded connection, the connection joint is firmly fixed and not easy to fall off, and even if the string light is placed outdoors, the threaded connection brings excellent sealing performance and good waterproof effect, which well protect the plurality of light bodies.

In the step S3, the second light-emitting body connection structure is connected with the second opening 22 of one of the plurality of lampshades 2, and at the same time, the power connecting port 12 of the second light-emitting body connecting structure is completely plugged into the second end of the one of the plurality of light-emitting bodies 31. It should be noted that: the power connecting port 12 of the second light-emitting body connecting structure is first aligned with and abuts against the second end of the one of the plurality of light-emitting bodies 31. Then, the second light-emitting body connection structure is screwed with the second opening 22 of one of the plurality of lampshades 2. A screwing process thereof is a process of plugging the power connecting port 12 of the second light-emitting body connecting structure into the second end of the one of the plurality of light-emitting bodies 31. When the second light-emitting body connection structure is completely screwed with the second opening 22 of one of the plurality of lampshades 2, the power connecting port 12 of the second light-emitting body connecting structure is completely plugged into the second end of the one of the plurality of light-emitting bodies 31.

The above description of the disclosed embodiments enables those skilled in the art to implement or use the present disclosure. A variety of modifications to these embodiments are apparent to those skilled in the art, and general principles defined in the specification can be implemented in other embodiments without departing from the spirit or scope of the present disclosure. Thus, the present disclosure should not be limited to the embodiments disclosed herein, and should be subject to the widest scope consistent with the principles and novel features disclosed herein.

What is claimed is:

1. A light body, comprising:

a lampshade, two light-emitting body connecting structures, and a light-emitting body;

wherein an accommodating cavity is defined in the lampshade; openings communicated with the accommodating cavity are defined on the lampshade; and the openings comprise a wiring input terminal opening and a wiring output terminal opening;

the two light-emitting body connecting structures comprise wiring terminals; the wiring terminals comprise terminal bodies matched with the openings and power connecting ports; the terminal bodies are respectively detachably connected with the openings; each of the power connecting ports protrudes from an end surface of a first end of a corresponding terminal body of the terminal bodies;

a size of each of the power connecting ports is less than a size of each of the openings of the lampshade; each of the power connecting ports is insertable into the lampshade from a corresponding opening of the openings to align and connect with the light-emitting body, a diameter of each of the power connecting ports is smaller than that of a corresponding terminal bodies;

the light-emitting body is detachably arranged in the accommodating cavity of the lampshade; power connecting plugs are arranged on the light-emitting body, each of the power connecting plugs comprise a positive electrode and a negative electrode coaxially aligned; when the light-emitting body is arranged in the accommodating cavity, the light-emitting body is connected with the openings of the lampshade through the two light-emitting body connecting structures, and the power connecting plugs arranged on two ends of the light-emitting body are respectively plugged into the power connecting ports of the two light-emitting body connecting structures, and each power connecting plug is rotatably connected with a corresponding power connecting port of the light-emitting body connecting structures.

2. The light body according to claim 1, wherein outer threads are defined on an outer side of each of the terminal bodies; inner threads are defined on each of the openings; the outer threads are matched with the inner threads; the power connecting ports comprise rotatable plugs configured to plug into the light-emitting body.

3. The light body according to claim 2, wherein the light body comprises wire rods, each of the wire rods passes through a second end of a corresponding terminal body of the terminal bodies and is electrically connected with a corresponding power connecting port of the power connecting ports.

4. The light body according to claim 3, wherein an annular limiting piece is arranged on an end surface of the second end of each of the terminal bodies.

5. The light body according to claim 3, wherein one handle piece arranged on one side of an end portion of each of the wire rods is connected with the second end of each of the terminal bodies, or a plurality of handle pieces respectively arranged on two sides of the end portion of each of the wire rods are connected with the second end of each of the terminal bodies.

6. The light body according to claim 1, wherein the power connecting plugs comprise a wiring input terminal plug and a wiring output terminal plug; the wiring input terminal plug and the wiring output terminal plug are respectively arranged on the two ends of the light-emitting body; a power supply input terminal of the light-emitting body is electrically connected with the wiring input terminal; a power supply output terminal of the light-emitting body is electrically connected with the wiring output terminal plug.

7. The light body according to claim 6, wherein the light-emitting body comprises a light strip and a support; the light strip is wrapped on an outer side of the support.

8. The light body according to claim 7, wherein the light body further comprises a circuit board; the support is hollow and the circuit board is arranged inside the support; the circuit board is electrically connected with the light strip; the wiring input terminal plug and the wiring output terminal plug are respectively fixedly arranged on two ends of the circuit board; an input terminal of the circuit board is electrically connected with the wiring input terminal plug, and an output terminal of the circuit board is electrically connected with the wiring output terminal plug.

9. The light body according to claim 8, wherein the light strip comprises a flexible printed circuit board and a plurality of LEDs on the flexible printed circuit board, and the flexible printed circuit board is disposed and wrapped on the support.

10. A string light, comprising a plurality of light bodies according to claim 1 and a plurality of wires; the plurality of light bodies comprise a plurality of lampshades;

wherein each of the light-emitting body connecting structures of each of the plurality of light bodies are electrically connected with a corresponding light-emitting body connecting structure of an adjacent light body through a corresponding wire, so that the plurality of lampshades are connected in series through the plurality of wires.

11. The string light according to claim 10, wherein hanging pieces are hung on the plurality of wires.

12. A light body, comprising:

a lampshade, two light-emitting body connecting structures, and a light-emitting body;

wherein an accommodating cavity is defined in the lampshade; openings communicated with the accommodating cavity are defined on the lampshade; and the openings comprise a wiring input terminal opening and a wiring output terminal opening;

the two light-emitting body connecting structures comprise wiring terminals; the wiring terminals comprise terminal bodies matched with the openings and power connecting ports; the terminal bodies are respectively detachably connected with the openings; each of the power connecting ports protrudes from an end surface of a first end of a corresponding terminal body of the terminal bodies;

each of the power connecting ports are insertable into the lampshade from a corresponding opening of the openings to align and connect with the light-emitting body;

the light-emitting body is detachably arranged in the accommodating cavity of the lampshade; power connecting plugs are arranged on the light-emitting body, each of the power connecting plugs comprise a positive electrode and a negative electrode coaxially aligned; when the light-emitting body is arranged in the accommodating cavity, the light-emitting body is connected with the openings of the lampshade through the two light-emitting body connecting structures, and the power connecting plugs arranged on two ends of the light-emitting body are respectively plugged into the power connecting ports of the two light-emitting body connecting structures, and each power connecting plug is rotatably connected with a corresponding power connecting port of the light-emitting body connecting structures;

wherein the light body further comprises a circuit board and a light strip electrically connected with the circuit board, the wiring input terminal plug and the wiring output terminal plug are respectively fixedly arranged on two ends of the circuit board; an input terminal of the circuit board is electrically connected with the wiring input terminal plug, and an output terminal of the circuit board is electrically connected with the wiring output terminal plug, and the circuit board is surround and wrapped by the light strip.

13. The light body according to claim 12, wherein the light body further comprises a support disposed between the circuit board and the light strip, the circuit board is disposed inside of the support, and the light strip is wrapped on an outer surface of the support.

14. The light body according to claim 13, wherein the support is hollow and annular.

15. The light body according to claim 13, wherein the light strip comprises a flexible printed circuit board and a plurality of LEDs on the flexible printed circuit board, and the flexible printed circuit board is disposed and wrapped on the support.

* * * * *